United States Patent [19]

Muscat

[11] Patent Number: 4,687,247
[45] Date of Patent: Aug. 18, 1987

[54] POWERED TONNEAU COVER FOR CONVERTIBLE AUTOMOBILES

[76] Inventor: Peter P. Muscat, 14980 Waterfall Rd., Northville, Mich. 48167

[21] Appl. No.: 720,349

[22] Filed: May 13, 1985

[51] Int. Cl.$^4$ ............... B60J 7/20; B60N 1/06
[52] U.S. Cl. ............... 296/136; 296/37.16; 296/65 R
[58] Field of Search ............ 296/37.16, 65 R, 66, 296/67, 68, 107, 136; 100/222

[56] References Cited

U.S. PATENT DOCUMENTS

| | | | |
|---|---|---|---|
| 2,117,409 | 5/1938 | Dorsey | 296/68 |
| 2,599,277 | 6/1952 | Orr | 296/107 |
| 2,959,447 | 11/1960 | Stebbins et al. | 296/136 |
| 2,992,042 | 7/1961 | Gilson et al. | 296/136 |
| 3,154,341 | 10/1964 | Booth | 296/136 |

FOREIGN PATENT DOCUMENTS 464270  4/1937  United Kingdom ............... 296/107

Primary Examiner—Robert B. Reeves
Assistant Examiner—Dennis H. Pedder
Attorney, Agent, or Firm—John R. Benefiel

[57] ABSTRACT

A powered tonneau cover is disclosed made up of an assembly of rigid panels configured to cover the convertible top storage space of a convertible automobile with the top either raised or lowered. The panel assembly includes a pair of inwardly movable side panels configured to cover side regions of the storage space on either side of a passenger seat as well as the adjacent rear areas, a fixed center panel, and a pair of lapping panels each affixed to a side panel and extending over the center panel. The panel assembly is mounted to the upper edge of the seat, cantilevered to extend to the rear over the storage space. The passenger seat is pivotally mounted for powered tilting motion to carry the panel assembly forwardly and enabling access to the storage space allowing the convertible top to be raised or lowered. The side panels are moved inwardly by a drive mechanism to clear the side regions prior to tilting of the seat. Rearward tilting movement of the seat and re-extension of the side panels repositions the panel assembly in position overlying the storage space.

13 Claims, 10 Drawing Figures

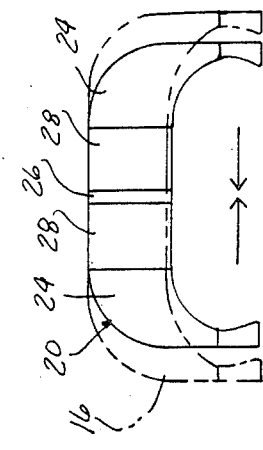
FIG-2
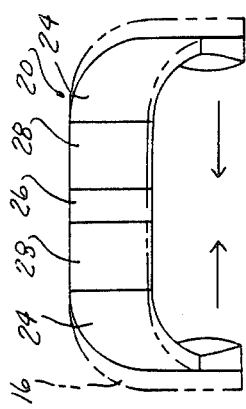
FIG-3
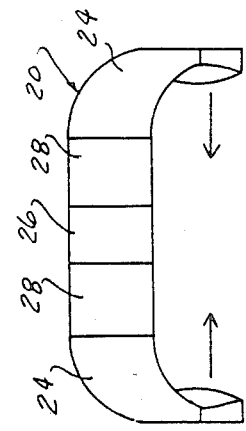
FIG-4
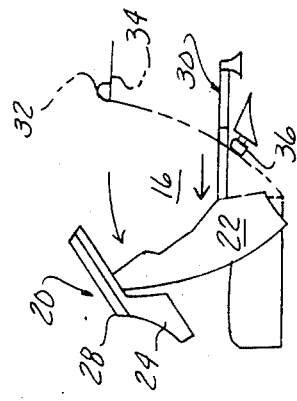
FIG-7
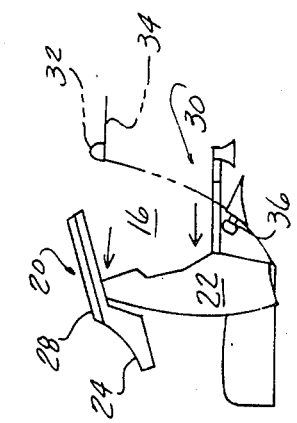
FIG-6
FIG-5

POWERED TONNEAU COVER FOR CONVERTIBLE AUTOMOBILES

BACKGROUND OF THE INVENTION

This invention concerns convertible automobiles and more particularly tonneau cover arrangements for convertible tops.

Convertible automobile bodies include a storage space to the rear and sides of the passenger compartment, usually immediately to the rear of a side-by-side passenger seat mounted within the passenger compartment of the automobile into which the convertible top is collapsed for storage. The storage space is usually configured having a first region extending immediately to the rear of the seat receiving the fabric top and the bow frame members, and side regions alongside the seat to accomodate the frame rail members.

For styling purposes, the storage space area is usually covered with a tonneau cover usually consisting of the fabric cover manually fastened over the storage space with the convertible top in the stored position. Alternately a rigid panel is adapted to be mounted in a position overlying the storage area flush with the surrounding body surfaces.

It is highly desirably for aesthetic purposes that a tonneau cover be adapted to overlie the storage space with the convertible top in either the stored or up position to provide a finished interior appearance to the passenger compartment. It is also highly desirable that a simplified power actuation of the tonneau cover be allowed in order to enhance the convenience of raising and lowering of the convertible top.

In the instance of the movable hard tonneau panel, one arrangement heretofore known involves a rear hinged tonneau panel which is raised in order to allow movement of the top frame into and out of the storage space with the tonneau cover thereafter lowered into position. In this design the rear of the top frame must be subsequently secured to the tonneau panel after raising the top and lowering of the tonneau panel in order to close the tonneau panel with the top in the "up" position.

That is, the top is first raised, the tonneau panel lowered past a partially elevated rear section of the top frame, with the rear section of the top frame then subsequently secured to the tonneau panel to complete the top raising operation. This obviously is a relatively complicated top raising procdure, lessening the convenience of raising the convertible top.

Accordingly, it is the object of the present invention to provide a tonneau cover arrangement in which a hard panel cover assembly is adapted to cover the storage space in a convertible automobile body in both the top raised and stored positions, which allows for powered tonneau cover actuation and a simplified two step process which does not necessitate the attachment of the rear of the convertible top to the tonneau cover panel.

It is a further object of the present invention to provide such powered tonneau cover which affords a highly aesthetic covering of the storage area in both the top raised and stored conditions.

It is still another object of the present invention to provide such powered tonneau cover which allows for raising or lowering of the top quickly and conveniently.

SUMMARY OF THE INVENTION

These and other objects which will be appreciated upon a reading of the following specification and claims are achieved by providing a tonneau panel assembly attached to a seat back portion of a passenger seat located just forwardly of the rear storage area and between side regions thereof, the panel assembly mounted to extend at a fixed angle to the seat back portion be cantilevered over the rear storage space. The seat is pivotally mounted to enable forward tilting motion of the seats to carry the cantilevered tonneau panel assembly forwardly to completely expose the storage space and enable the convertible top to be raised or lowered past the now forward positioned tonneau panel assembly.

The tonneau panel assembly includes a pair of side panels configured to extend over the storage areas alongside the seat and the adjacent rear areas of the storage space. The side panels are mounted for powered inward movement prior to poneered forward tilting of the seat in order to enable the tonneau panel assembly to move past the side storage areas as it is carried forward with the seat pivoting motion. The side panels include a pair of lap panels, each mounted atop one of the side panels adjacent the inboard edge to overlie a fixed center panel, such that the in and out movement of the side panels is accomodated without exposing a gap.

The in and out movement of the side panels as well as the tilting motion of the seat is accomplished by a rack and gear drive arrangement powered by rotary drive unit and a series of rotary drive cables driving respective pinion gear drive units.

The seat drive mechanism includes an elongated track having a rack gear attached thereto and a guide member receiving the elongated track member, carrying the rotary pinion gear drive unit, with the track and guide members mounted to the seat and vehicle body respectively so that powered motion of the seat occurs upon rotation of the pinion gear.

The panel drive includes a pair of panel flange members slidably received in either end of a elongated guide member mounted along the upper edge of the seat, with gear tracks mounted to each flange member and a respective pinion gear drive unit mounted to the guide member located to engage each rack gear and cause in and out movement of the side panels upon rotation of the respective pinion gears by respective flexible drive cables.

The seat is mounted by means of a rear metal panel with hinges at either side thereof mounted to the bottom of the storage space and with a pair of fixed stops locating the passenger seat in the vertical position.

BRIEF DESCRIPTION OF THE DRAWINGS

FIGS. 2–4, are diagrammatic views of the tonneau panel assembly according to the present invention depicting successive stages of actuation of the side panels moving inwardly.

FIGS. 5–7, are diagrammatic representations of the tonneau panel assembly according to the present invention depicting successive stages of the seat tilting motion.

DETAILED DESCRIPTION

In the following detailed description certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
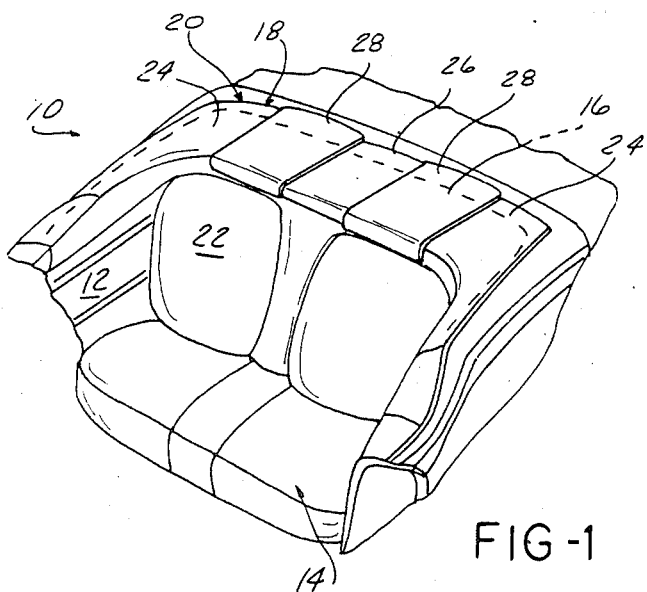
FIG. 1, is a fragmentary perspective view of a convertible automobile showing the tonneau cover arrangement according to the present invention.

Referring to the drawings and particularly FIG. 1, the power tonneau cover arrangement according to the present invention is adapted for use with convertible automobiles of the type having a vehicle body 10 defining a passenger compartment 12 in which is mounted a rear seat 14. The vehicle body 10 has portions defining a storage space 16 having areas thereof immediately to the rear of the seat 14 and also areas along either side thereof to accommodate the convertible top frame members and covering (not shown).

The power tonneau cover arrangement 18 according to the present invention includes a tonneau panel assembly 20 configured to cover the storage space 16 in the region immediately to the rear of the seat 14 and also alongside the seat 14 as indicated.

According to the concept of the present invention the tonneau panel assembly 20 is mounted fixed to the upper edge 22 of the seat 14 so as to extend at a fixed angle and so to cantilevered normally extending to the rear over the storage space 16. The tonneau panel assembly 20 includes a pair of rigid movable side panels 24 mounted to be movable laterally in and out, towards and away from a fixed central panel 26 with each of the side panels 24 carrying a lap panel 28 to accommodate the in and out movement without exposing a gap throughout the range of in and out motion of the side panels 24.

Each of the side panels 24, center panel 26, and the lap panels 28 include lip portions as shown in FIG. 1 extending downwardly over the adjacent portions of the body and seat 14 to provide a smooth aesthetically pleasing finished appearance.

The convertible top (not shown) is adapted to be moved in and out of the storage space in which it is stored in being moved to the raised or stowed positions, upon movement of the tonneau panel assembly 20 out of position overlying the storage space 16.

This movement accomplished by a two step actuation of the tonneau panel assembly 20 as depicted diagramatically in FIGS. 2 through 4 and 5 through 7. In FIG. 2, the tonneau panel assembly 20 is shown in position entirely overlying the storage space 16, with the rear edge tight against weather stripping seal 32 mounted on the body 34 extending around the rear of the storage space 16. In FIG. 3, the side panels 24 have begun inward motion, partially exposing the storage space 16 with the lapping panel 28 narrowing the exposed section of fixed center panel 26. In FIG. 4, the inward movement of the panels is complete, and each of the side panels 24 have moved sufficiently laterally towards each other to clear the body structure defining the side regions of the storage space 16.

As will be described hereinafter in further detail, the tonneau panel assembly 20 is rigidly fixed to be cantilevered from the upper edge of the passenger seat 22 extending to the rear to normally overlie the storage space 16. The passenger seat 22 is pivotally mounted such as to be able to be tilted forward under power by an actuating mechanism 30 as shown in FIGS. 5-7.

Subsequently, after the inward motion of the side panels 24 is completed, the actuating device 30 is operated to move the passenger seat 22 from the generally vertical position shown in FIG. 5, with the tonneau panel assembly 20 overlying the storage space 16 and the seat 22 held against fixed stops 36 mounted in the interior of storage space 16. This movement is shown as partially completed in FIG. 6, beginning to open up the storage space 16. Upon completion, the opening movement is sufficient to fully open the storage space 16, as shown in FIG. 7, so as to allow the convertible top to be moved into or out of the storage space 16 past the cantilevered tonneau panel assembly 20.

The actuating device 30 thereafter returns the passenger seat 22 against the fixed stop 36.

Figure 9:
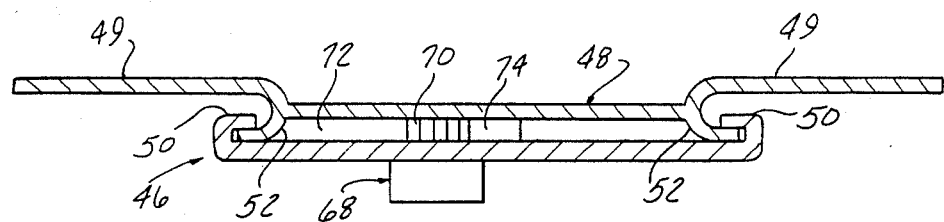
FIG. 9, is a view of the section 9—9 taken in FIG. 8.
Figure 10:
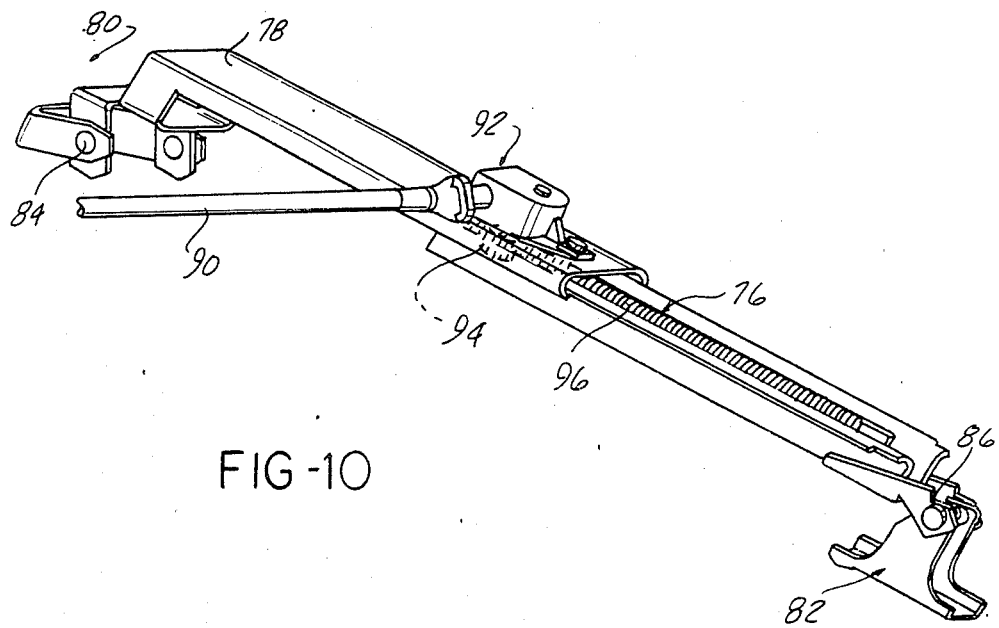
FIG. 10, is an enlarged perspective view of the seat drive mechanism shown in FIG. 8.
Figure 8:
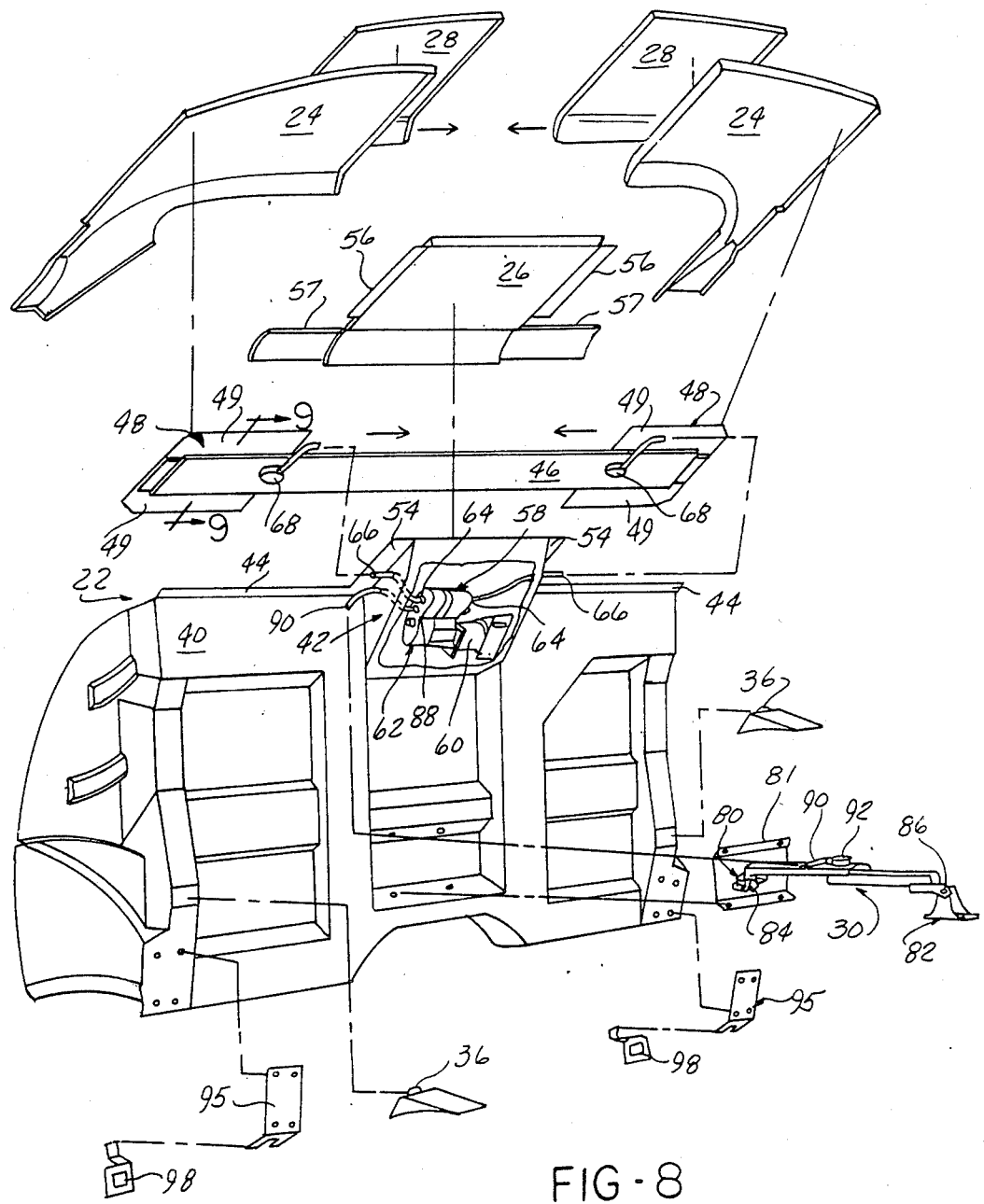
FIG. 8, is an exploded perspective view of the components comprising the power tonneau cover arrangement according to the present invention.

Referring to FIGS. 8-10, the details of construction of the tonneau cover arrangement 10 according to the present invention are depicted. Each of the side panels 24, the lap panels 28 and the center panel 26 are preferably formed of a light weight yet rigid construction such as a molded resin covered with a decorative surfacing material such as textured vinyl.

The side panels 24 are shaped with an "arm" portion shaped to cover the side region of the storage space 16 alongside the passenger seat 22, with the remaining portion shaped to cover the portion of the region of the storage space 16 adjacent the side regions immediately to the rear of the passenger seat 22.

Each of the side panels 24 is fastened to a respective lap panel 28, as by means of threaded fasteners (not shown), with the lap panel 28 positioned on the inboard side of a respective attached side panel 24. The passenger seat 22 includes a rear panel of formed metal 40 having an upper central region thereof shaped to define an enclosure 42, with mounting flanges 44 extending along the upper edge and flanges 54 on either side of the enclosure 42 as shown.

Elongated guide member 46 is fastened to the flange 44 as by threaded fasteners (not shown) such as to be securely mounted thereto extending transversely across the passenger compartment. The elongated guide member 46 in turn slidably receives a pair of flange members 48 each secured to a respective side panel 24 as by threaded fasteners. The flange member 48 and guide track 46 are interfit as shown in FIG. 9 to allow the guided in and out movement of the side panels 24 which are attached to flanges 49 of the flange member 48 as by threaded fasteners (not shown). The guide member 46 is formed with a lip on either lengthwise edge thereof into which is interfit a lips 52 formed on either side of the respective flange member 48. The center panel 26 is fitted over the elongated guide member 46 and mounted as by means of threaded fasteners (not shown) to the flange 56 formed on the center panel and flanges 54 adjacent the enclosure 42.

A sheet metal member 57 is provided having ends each underlying a respective side panel 24 to support the free end of the side panel during its in and out motion.

Drive means is provided in order to provide powered actuation of the in-and-out movement of the flange members 48 and the attached side panels 24. This includes a rotary drive assembly 58 mounted within the enclosure 42 and adapted to provide a rotary output, including an electric motor 60 driving a geared reducer 62 as are commercially available to provide a rotary output 64 on either end driving rotary flexible drive cables 66. The drive cables 66 are connected to in turn drive right angle drive units 68 each of a type commercially available, mounted on the under side of a respective guide track 46 as shown in FIG. 9. The right angle drive 68 includes an output pinion gear 70 disposed in a space 72 created between the flange member 48 and the elongated guide member 46. Fastened to the under surface of the flange member 48 is an elongated rack gear 74 engaged with the pinion gear 70 such that upon rotation of the pinion gear, the flange member 48 is caused to traverse in the elongated guide member 46 to carry the side panels 24 in their in and out movement.

The rotary drive assembly 58 also provides rotary power to allow powered actuation of the passenger seat 22 through its tilting motion. The actuator 30 as best seen in FIG. 10, includes an elongated track member 76 received within a guide member 78 each connected respectively to plate 81 affixed to the rear seat panel 40 and the body portion adjacent to storage space 16 by means of mounting brackets 80 and 82, respectively, and pivoted at 84 and 86 to accomodate the tilting movement of the passenger seat 22. The gear reducer 62 is also provided with a rotary output 88 driving a flexible drive element 90 which in turn drives a right angle drive 92 mounted to the guide member 78 as shown in FIG. 10.

The right angle drive unit 92 includes an output pinion gear 94 in driving engagement with a rack gear 96 mounted to the elongated track member 76. Rotation of flexible drive element 90 and pinion gear 94 accordingly produces relative movement of the elongated member 76 and the guide member 78 towards or away from each other to thereby produce powered tilting movement of the passenger seat 22 towards or away from the vertical position against the fixed stops 36 in storage space 16. Fixed stops may be spring mounted to accommodate a slight lost motion during seating.

The rear panel 40 has mounted thereto a spaced pair of hinge members 95 and mating hinge members 98 are mounted to the body portions adjacent the lower end of the passenger seat 22 as indicated in FIG. 8, to provide the pivoting of the passenger seat 22 to enable the tilting motion.

Each of the right angle drives 68 and 92 are preferably of a self locking nature such as a worm gear drive so as to fix the position of the side panels 24 and the passenger seat 22 whenever the rotary drive is not actuated.

Accordingly, it can be appreciated that by the disclosed arrangement, the above recited objects of the present invention have been achieved in that highly aesthetic treatment of the tonneau cover has been afforded which allows a completely powered simplified operation in raising and lowering the convertible top between the stored and raised portions and which also provides a covering of the storage space 16 with the top in the raised and stored positions. The tilting motion of the passenger seat 22 carrying forward the tonneau cover assembly eliminates the two step procedure for securing the convertible top with the tonneau cover in position. The tonneau cover assembly 20 is positioned against the seal 32 with the convertible top in either the raised or lowered position.

I claim:

1. A powered tonneau cover arrangement for convertible automobiles of the type having a body having portions defining a passenger compartment with a passenger seat mounted therein said passenger seat having a back portion with an upper edge extending from side to side across said passenger compartment, said body also defining a convertible top storage space immediately to the rear of said passenger seat back portion and below said upper edge of said seat, the arrangement comprising:
   a tonneau panel assembly including at least one rigid panel, said panel assembly configured to overlie and close said storage space;
   said tonneau panel assembly rigidly mounted to said upper edge of said seat back portion so as to thereby extend at a fixed angle to said seat back portion and be cantilevered to extend rearwardly from said seat back portion and normally overlie said storage space in an upright position of said seat back portion; means mounting said passenger seat back portion enabling forward tilting movement thereof from said upright position to thereby carry said cantilevered tonneau panel assembly forwardly at said fixed angle and open said storage sapce to enable access thereto.

2. The tonneau cover arrangement according to claim 1 wherein said body portions also form storage space side regions located on either side of said passenger seat and wherein said tonneau panel assembly includes a pair of side panels each configured to cover a respective one of said side regions; each of said side panels mounted to be laterally movable in and out between a first position overlying said respective side region and a second position spaced inwardly therefrom sufficiently to clear said body portions forming said storage space side regions as said seat back portion is tilted forwardly.

3. The tonneau cover arrangement according to claim 2 further including seat actuator means drivingly engaged with said seat back portion causing said tilting movement of said seat back portion.

4. The tonneau cover arrangement according to claim 3 further including power means selectively causing powered in and out lateral movement of said side panels.

5. The tonneau cover arrangement according to claim 4 wherein said tonneau panel assembly further includes a center panel mounted to said seat back portion, and extending rearwardly therefrom at a fixed angle to normally overlie the center of said storage space, and also including a pair of lap panels, each of said lap panels lying over the upper side of a respective side panel and located so as to overlap said center panel throughout said movement of said respective side panel.

6. The tonneau cover assembly according to claim 3 wherein said seat actuator means comprises a rotary drive member and an elongated track member having a rack mounted therein; an elongated guide member carrying said rotary drive member, said elongated guide member receiving said track member for guided movement therein and positioning said rack in engagement with said drive member; said track member and said guide member each operatively associated with said seat back portion and with said body of said convertible automobile to cause tilting movement of said seat back portion as said track member is moved in said guide member; rotary drive means for rotating said rotary drive member to drive said rack and cause extending relative movement of said track and guide members to cause said tilting motion of said seat back portion.

7. The tonneau cover arrangement according to claim 4 further including a respective rack gear drivingly engaged to move with each of said side panels, and a respective rotary drive gear engaging each of said rack gears, said rotary drive means rotating each of said rotary drive gears causing each of said side panels to undergo in and out motion towards and away from each other.

8. The tonneau cover arrangement according to claim 7 further including an elongated guide member extending above said seat back portion along said upper edge and a pair of panel flange members slidably received in either end thereof for guided in and out movement; each side panel adapted to be moved through said lateral movement by in and out movement of a respective one of said side panel flange members.

9. The tonneau cover arrangement according to claim 3 further including a pair of fixed stops mounted in said storage space, said fixed stops located in said storage space to engage and thereby position said seat back portion in a generally vertical position.

10. The tonneau cover arrangement according to claim 1 wherein said seat back portion includes a rigid rear panel and said means pivotally mounting said seat back portion comprises spaced brackets operatively associated with said rear panel and with said convertible automobile body portions defining said storage space, respectively.

11. The tonneau cover arrangement according to claim 6 wherein said rotary drive means includes a flexible cable drive connected to said rotary drive gear.

12. The tonneau cover arrangement according to claim 5 wherein said seat back portion includes a rear metal panel, and including a centrally located rearwardly projecting enclosure integral with said metal panel and extending immediately below said center panel supporting said central panel.

13. The tonneau cover arrangement according to claim 12 wherein a rotary drive motor having a rotary output is included, mounted in said enclosure and also including means transmitting said rotary output to each of said seat actuator means and said side panels.

* * * * *